United States Patent [19]

Kono

[11] 4,203,627
[45] May 20, 1980

[54] PARALLEL PROPORTIONING VALVE FOR USE IN A DUAL BRAKING SYSTEM

[75] Inventor: Teruhisa Kono, Itami, Japan

[73] Assignee: Sumitomo Electric Industries, Ltd., Osaka, Japan

[21] Appl. No.: 911,089

[22] Filed: May 31, 1978

[30] Foreign Application Priority Data

Feb. 16, 1978 [JP] Japan ................................. 53-17406

[51] Int. Cl.² ............................................ B60T 8/26
[52] U.S. Cl. ................... 303/6 C; 303/22 R
[58] Field of Search ................... 60/564, 591; 137/87, 137/505, 517; 188/195, 349; 303/60, 22 R

[56] References Cited

FOREIGN PATENT DOCUMENTS

| | | | |
|---|---|---|---|
| 2748699 | 5/1978 | Fed. Rep. of Germany | 303/6 C |
| 1444397 | 7/1976 | United Kingdom | 303/22 R |

*Primary Examiner*—Duane A. Reger
*Attorney, Agent, or Firm*—Wenderoth, Lind & Ponack

[57] ABSTRACT

A parallel proportioning valve for use in a dual braking system composed of a casing having a pair of parallel chambers, each of the chambers having a fluid inlet connected to a pressure source and a fluid pressure supply outlet. A fluid pressure responsive plunger is accommodated in each of the chambers with a valve seat provided in a fluid passage between the inlet and outlet. The pressure responsive plunger is adapted to open and close the valve seat. A single spring urges a single plate which abuts at each end of the plungers and urges the plungers in the direction to open the valve seats, a pin is fixed to the abutting plate at the center thereof and has a shoulder formed by an annular notch therearound, and a hole is provided in the casing in the center between the chambers, the hole receiving the pin with a clearance which permits an inclination of the abutting plate which is caused by a normal difference of strokes between the plungers when the plungers are operating properly and which will not permit an inclination of the abutting plate which is caused by a stroke of the operative plunger when the other plunger is inoperative.

4 Claims, 4 Drawing Figures

LESS THAN X

PARALLEL PROPORTIONING VALVE FOR USE IN A DUAL BRAKING SYSTEM

BACKGROUND OF THE INVENTION

The present invention relates to a parallel proportioning valve for use in the fluid circuit of a dual braking system for a motor vehicle.

U.S. Pat. No. 3,423,936 owned by the Kelsey-Hayes Company discloses a proportioning valve comprising a chamber having an inlet connected to a pressure source and an outlet connected to a rear brake cylinder which is supplied with a reduced pressure and having a pressure responsive plunger accommodated within the chamber for opening and closing a fluid passage between the inlet and outlet and a spring for urging the plunger in the direction to open the fluid passage.

When the proportioning valve of this type is used in a fluid circuit of a dual braking system, a pair of such valves are disposed therein.

In order to save material and manufacturing costs, a valve device incorporating a pair of proportioning valve assemblies in a single casing is provided. However, the valve device is constructed so that each of the valve assemblies has its own spring for urging the pressure responsive plunger. This arrangement makes it difficult to compensate for normal differences in cut in points of the pressure reducing action of each valve assembly.

In addition, when one of the two systems becomes inoperative due to, for example, fluid leakage, it becomes preferable to compensate for the inoperative value by increasing the effective pressure being supplied to the rear brake cylinder by the other valve assembly which is in operation thus appropriately distributing the pressurization of the front and rear brakes.

However, since each of the valve assemblies has its own spring forcing each of the plungers, when one of the two braking systems becomes inoperative, the valve assembly in the other system continues to operate so that the reducing action will occur at a predetermined normal point without adjusting the cut-in point to a higher level of pressure.

SUMMARY OF THE INVENTION

A first object of the present invention is, therefore, to provide a parallel proportioning valve in which both of the proportioning valve assemblies have substantially the same cut-in point of pressure reducing action by absorbing the stroke difference of strokes between the pressure responsive plungers.

A second object of the present invention is to provide a parallel proportioning valve which is adapted so that the cut-in point of pressure reducing action increases in one of the valve assemblies when the other valve assembly is not operating due to a breakdown.

A third object of the present invention is to provide a parallel porportioning valve which can attain the above various objects and is simple to construct.

BRIEF DESCRIPTION OF THE DRAWINGS

Other objects and features of the present invention will become apparent from the following description of the invention with reference to the accompanying drawings, in which.

DETAILED DESCRIPTION OF THE PREFERRED EMBODIMENTS

Figure 1:
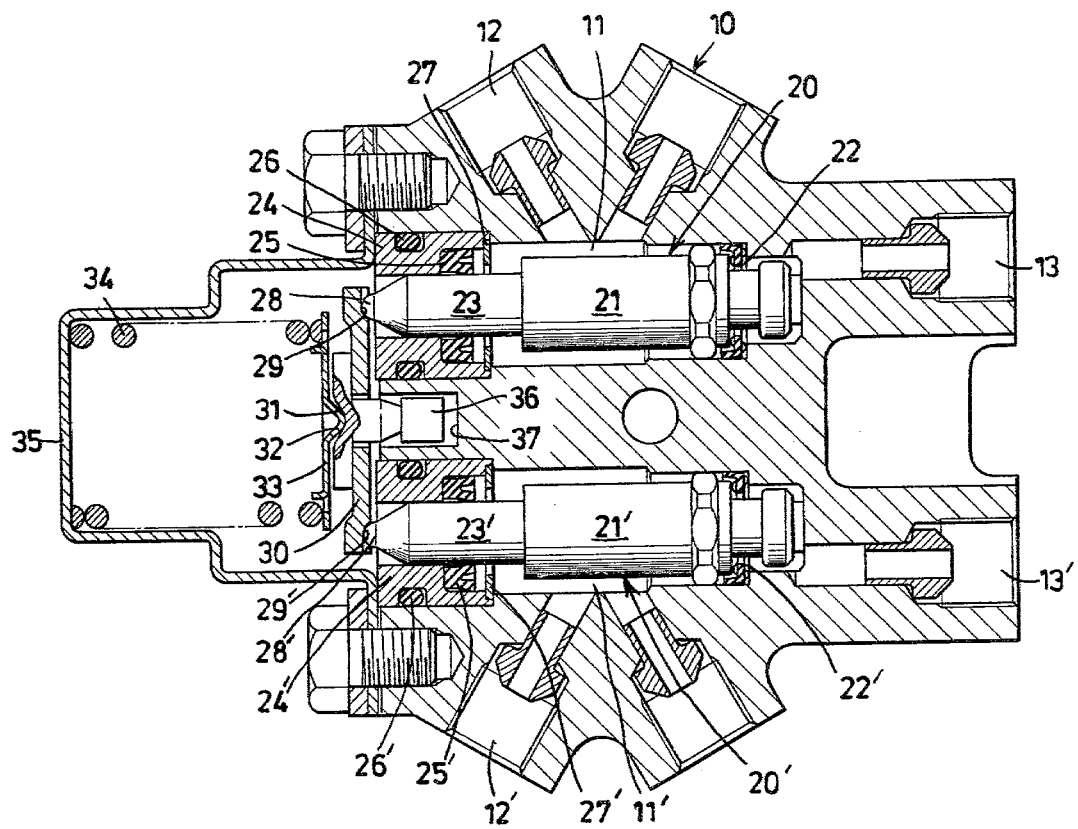
FIG. 1 is a longitudinally sectioned view showing a parallel proportioning valve of the present invention.

Referring now to FIG. 1, a casing designated by 10 has fluid chambers 11 and 11' which are parallel to each other. The chambers 11 and 11' have inlets 12 and 12' connected to a pressure souce (not shown) such as a tandem master cylinder, and outlets 13 and 13' for transmitting a proportionally reduced pressure to for example, two rear brake cylinders respectively.

In the chambers 11 and 11' are incorporated valve assemblies 20 and 20' respectively. The assembly 20 is composed of a pressure responsive plunger 21, a valve seat 22 which is opened and closed by the plunger 21, and a plunger guide 24 which pilots a shaft 23 of the plunger. A cut type seal 25 and O-ring 26 have the plunger guide 24 fitted therein to provide a liquid-tight seal of the chamber 11.

A washer 27 is fitted in the inner end of the guide 24 to prevent the removal of the cup type seal 25.

The other valve assembly 20' constructed exactly the same. The corresponding parts having the same numbers with a prime.

The ends of the plungers 21 and 21' are rounded or conically shaped as shown at 28 and 28' and project slightly out of the guides 24 and 24' and pivotally engage recesses 29 and 29' of an abutting plate 30, respectively. A spherical or conically shaped recess 31 is provided on the center of the abutting plate 30, and pivotally engages a projection 32 which is provided on the center of a spring receiving plate 33 which receives a spring 34 mounted between the plate 33 and a cup-shaped cap 35 which closes the end face of the casing 10. The pivotal engagement of the receiving plate 33 and the abutting plate 30 makes possible the equal transmission of the force of the spring 34 to both plungers 21 and 21' since the center of the load of the spring 34 will be kept centered at the abutting portion regardless of the inclination of the abutting plate 30.

At the center of the abutting plate 30 is fixed a pin 36 which is inserted in a hole 37 which is provided in the casing 10 at the center between the chambers 11 and 11'. The pin 36 has an annular notch 38 about the periphery and adjacent to the base portion thereof to form a shoulder 39 which is substantially square to the outer periphery of the pin. Between the pin 36 and the hole 37 is provided a clearance which will be explained hereinafter.

In operation of the parallel proportioning valve of the present invention, when the inlet 12 of the chamber 11 has a fluid pressure applied from a pressure source under normal operating conditions wherein both parts of the dual braking system is working, the fluid pressure acts on the effective area corresponding to the sectional area of the shaft 23 of the plunger 21 within the chamber 11 to force the plunger in a leftward direction. However, since the pressure of the spring 34 overcomes the leftwardly biasing force of the fluid on the plunger, it keeps its position as shown by the solid lines in FIG. 2 and the valve seat 22 remains open thus permitting the direct release the fluid pressure at the outlet 13.

When the fluid pressure is further increased so that the leftwardly biasing force on the plunger 21 finally overcomes the force of the spring 34, then the plunger 21 is moved in the leftward direction to close the valve seat 22. At that point, a proportionately reduced pressure is transmitted by the vibration of the plunger 21 through the outlet 13.

The other proportioning valve assembly 20' operates in the same manner as the assembly 20.

Figure 2:
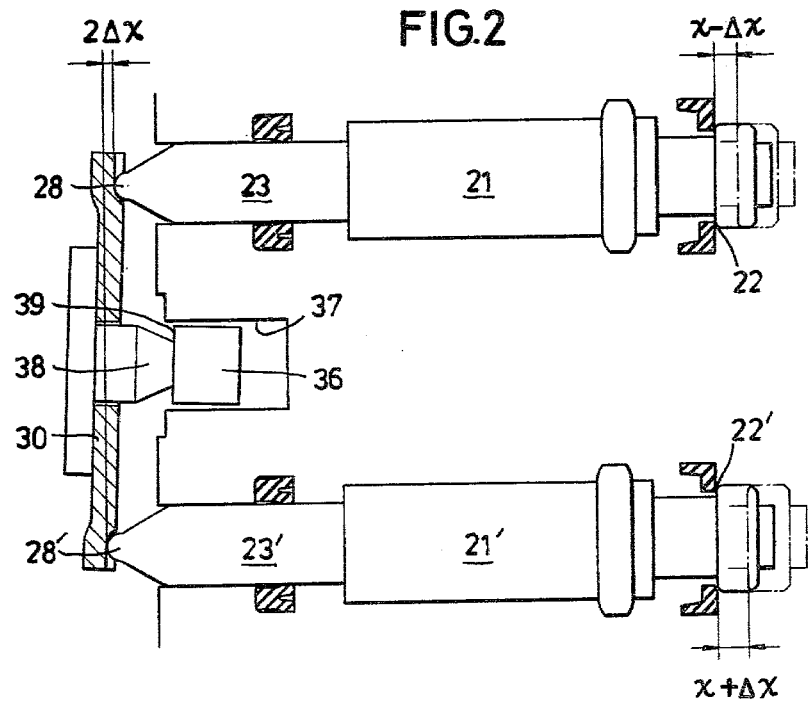
FIGS. 2 and 3 are diagrammatical views for explaining the operation of a parallel proportioning valve of the present invention.

Meanwhile, assuming that a difference of $\pm \Delta x$ exists between the strokes of the plungers 21 and 21' during the normal operating condition of both stages of the dual braking system due to the errors caused in machining and assembling, when the plungers projecting from the guides 24 and 24' would at their maximum have one end of one of the plungers projecting beyond the other by an amount equal to $2\Delta x$ as shown in FIG. 2. At this time, if the abutting plate 30 inclines accordingly, both of the plungers 21 and 21' uniformly receive the force of the spring 34 for permitting the pressure reducing action to occur substantially simultaneously and with equal pressure. This equalizing effect can be attained by designing the clearance between the pin 36 and the hole 37 in a range which permits the inclination of the abutting plate which is caused by the difference of strokes between the plungers during the normal operating condition of the dual braking systems.

Figure 3:
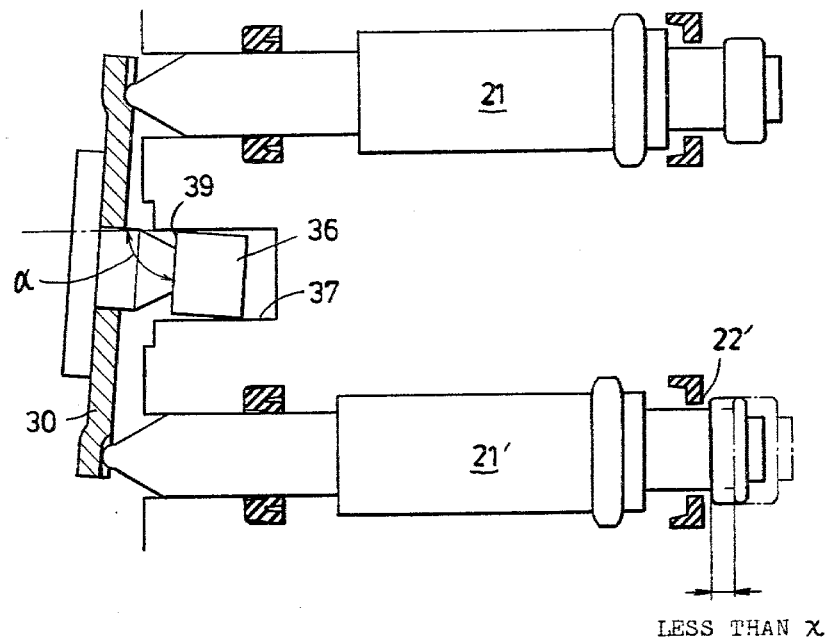

When one stage of the dual braking system does not operate due to fluid leakage or the like, the inoperative plunger maintains its original position, i.e., the stroke thereof is zero. As a result, the abutting plate 30 is inclined according to the stroke of the operative plunger, as shown in FIG. 3. Before the inclination reaches the maximum, i.e., before the pressure reducing action is effected by the normal operating stroke of the operative plunger, if the guide pin 36 is adapted to contact to the inner periphery of the hole 37 as shown in FIG. 3, a further inclination of the abutting plate 30 is restricted. In this state, if the abutting plate 30 is further pushed in a leftward direction by the operative plunger 21', the shoulder 39 will bite the inner periphery of the hole 37 so that the pin 37 is held at this position for limiting the movement of the abutting plate 30 in the axial direction of the plungers. As a result, the stroke of the operative plunger 21' is stopped so that it cannot close the valve seat 22' thereby preventing the pressure reducing action of the operative plunger and directly transmitting the fluid pressure supplied from the pressure source.

Figure 4:
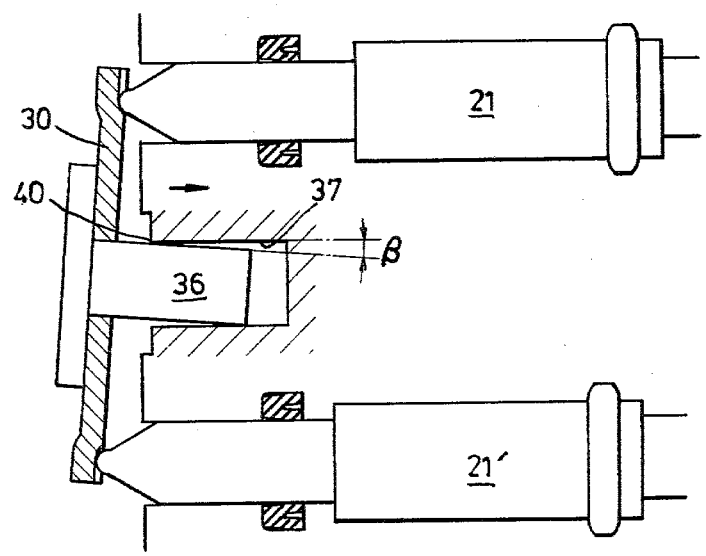
FIG. 4 is a diagramatical view of the prior art for comparing with the operation of a parallel proportioning valve of the present invention.

If no shoulder is provided about a pin just like a pin 36' of FIG. 4, it becomes difficult to maintain the position of the abutting plate 30 since sliding will occur at the contacting point of the pin 36' and a corner 40 of the mouth of the hole 37 as described below.

Considering the relation between the corner 40 of the hole 37 and the pin 36' which contacts it, it is assumed that a force for pushing the corner 40 in the direction of arrow is applied thereto. In this state, when the angle $\beta$ formed by the inner periphery of the hole 37 and the outer periphery of the pin 36' is very small, sliding at the contacting point will easily occur. On the other hand in the present invention, since the angle $\alpha$ formed by the inner periphery of the hole 37 and the shoulder 39 which relatively corresponds to the corner 40 is much larger than the angle $\beta$, the shoulder will more securely bite the inner periphery of the hole 37 and the pin 36 therefore becomes more difficult to slide.

As mentioned above, when the pin 36 contacts the hole 37 to limit the inclination of the abutting plate 30 when one stage of the dual braking system is inoperative, if the inclination of the abutting plate is adapted so as not to allow a normal stroke of the operative plunger, the valve seat will not be closed to stop the pressure reducing action. Thus, the fluid pressure supplied from the operative valve assembly is greatly increased when compared to the fluid pressure in the operative valve assembly when both of the valve assemblies are in operation.

What is claimed is:

1. A parallel proportioning valve for use in a dual braking system comprising:
    (a) a casing, said casing having a pair of fluid chambers each of said chambers having a fluid inlet for connection to a pressure source and a fluid outlet for connection to a brake means, said casing additionally having a hole in the center between said fluid chambers;
    (b) a fluid pressure responsive plunger located in each of said fluid chambers;
    (c) valve seat means located in fluid passages, said fluid passages defined as the path between said fluid inlets and said fluid outlets of each of said fluid chambers, said valve seat means provided for closing said fluid passages upon actuation of said fluid pressure responsive plungers by seating said plungers therein;
    (d) an abutting plate located adjacent said fluid pressure responsive plungers and abutting one end of each of said fluid pressure responsive plungers;
    (e) spring urging means acting on said abutting plate for urging said abutting plate to urge said fluid pressure responsive plungers into an open state in relation to said valve seat means; and
    (f) a pin fixed to the center of said abutting plate and received in said hole in said casing and having a size relative to said hole for allowing inclination of said abutting plate due to differences in fluid pressure responsive plunger movement during normal operating conditions, said pin further having a shoulder there around having a biting edge thereon for biting into the surface of said casing when said abutting plate is urged by only one plunger in a direction to pull said pin out of said hole and preventing movement of said abutting plate away from said casing, whereby when one of said fluid pressure responsive plungers fails the valving operation of the remaining operative fluid pressure responsive plunger is disabled.

2. A parallel proportioning valve as claimed in claim 1 wherein said pin has an annular notch with said shoulder there around.

3. A parallel proportioning valve as claimed in claim 1 wherein the ends of said fluid pressure responsive plungers engage diametrically opposite end portions of said abutting plate.

4. A parallel proportioning valve as claimed in claim 1, further comprising:
    a spring receiving plate mounted between said spring and said abutting plate for pivotally engaging said abutting plate at the center thereof for transmitting the force of said spring through said pivot.

* * * * *